US010569761B2

(12) United States Patent
Ikushima (10) Patent No.: US 10,569,761 B2
(45) Date of Patent: Feb. 25, 2020

(54) VEHICLE DRIVE APPARATUS

(71) Applicant: TOYOTA JIDOSHA KABUSHIKI KAISHA, Toyota-shi, Aichi (JP)

(72) Inventor: Yoshihiro Ikushima, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/284,641

(22) Filed: Feb. 25, 2019

(65) Prior Publication Data
US 2019/0263383 A1   Aug. 29, 2019

(30) Foreign Application Priority Data

Feb. 28, 2018   (JP) .................................. 2018-035971

(51) Int. Cl.
*B60W 20/15* (2016.01)
*B60K 6/26* (2007.10)
*B60K 6/52* (2007.10)
*B60K 7/00* (2006.01)
*B60K 6/405* (2007.10)

(52) U.S. Cl.
CPC .............. *B60W 20/15* (2016.01); *B60K 6/26* (2013.01); *B60K 6/52* (2013.01); *B60K 6/405* (2013.01); *B60K 2007/0038* (2013.01)

(58) Field of Classification Search
CPC .................................................. B60W 20/15; B60K 6/26; B60K 6/52; B60K 6/405; B60K 2007/0038; B60K 17/16; B60K 17/08; B60K 17/02; B60K 2001/001
See application file for complete search history.

(56) References Cited

U.S. PATENT DOCUMENTS

| 5,513,719 A * | 5/1996 | Moroto ..................... B60K 6/24 180/65.21 |
| 5,715,901 A * | 2/1998 | Tokushima ............... F16H 1/06 180/65.6 |
| 5,893,812 A * | 4/1999 | Narai ..................... B60K 23/04 475/204 |
| 2002/0077209 A1 * | 6/2002 | El-Antably ............. B60K 6/26 475/159 |

(Continued)

FOREIGN PATENT DOCUMENTS

JP            H8-294249 A          11/1996

*Primary Examiner* — Erez Gurari
(74) *Attorney, Agent, or Firm* — Oliff PLC (57) ABSTRACT

A vehicle drive apparatus includes a connection/disconnection sleeve wherein a lubricating pipe is provided above the connection/disconnection sleeve and has a discharge port through which a lubricating oil is discharged, the drive gear is relatively rotatably supported by the input shaft via a bearing portion provided on the drive gear, and the connection/disconnection sleeve includes a first guide portion guiding the lubricating oil discharged from the discharge port of the lubricating pipe to a tooth surface of the drive gear when the connection/disconnection sleeve is in a first position so as to connect the drive gear and the input shaft; and a second guide portion guiding the lubricating oil discharged from the discharge port of the lubricating pipe to the bearing portion when the connection/disconnection sleeve is in a second position so as to disconnect the drive gear and the input shaft.

9 Claims, 4 Drawing Sheets

(56) References Cited

U.S. PATENT DOCUMENTS

| | | | | |
|---|---|---|---|---|
| 2010/0222171 | A1* | 9/2010 | Tabata | B60L 50/16 |
| | | | | 475/5 |
| 2011/0240431 | A1* | 10/2011 | Iwase | B60K 6/26 |
| | | | | 192/3.29 |
| 2014/0262674 | A1* | 9/2014 | Saito | B60K 6/387 |
| | | | | 192/70.11 |
| 2016/0186855 | A1* | 6/2016 | Tahara | F16H 57/0471 |
| | | | | 74/413 |
| 2016/0280064 | A1* | 9/2016 | Nozu | B60K 17/34 |
| 2019/0329642 | A1* | 10/2019 | Hori | B60K 6/365 |
| 2019/0351756 | A1* | 11/2019 | Pritchard | B60K 6/547 |

* cited by examiner

VEHICLE DRIVE APPARATUS

This application claims priority from Japanese Patent Application No. 2018-035971 filed on Feb. 28, 2018, the disclosure of which is herein incorporated by reference in its entirety.

FIELD OF THE ART

The present invention relates to a technology in which in a vehicle drive apparatus including a connection/disconnection sleeve that selectively disconnects or connects a drive gear and an input shaft or the drive gear and a non-rotating member, a lubricating oil is supplied to a corresponding part according to whether the drive gear and the input shaft or the drive gear and the non-rotating member are disconnected or connected.

BACKGROUND ART

A vehicle drive apparatus is known that includes (a) a rotating electrical machine which serves as a drive power source for a plurality of wheels; (b) an input shaft which is coupled to the rotating electrical machine in a power transmittable manner and rotatably about a first rotation axis; (c) a counter shaft which is provided rotatably about a second rotation axis parallel to the first rotation axis; (d) a drive gear which engages with a gear provided on the counter shaft and which is provided in the input shaft relatively rotatably to the input shaft; and (e) connection/disconnection sleeve which is driven in the direction of the first rotation axis so as to selectively disconnect or connect the drive gear and the input shaft, and (f) the vehicle drive apparatus transmitting drive power from the rotating electrical machine through the input shaft and the counter shaft to the wheels so as to drive the wheels. An example thereof is a vehicle drive apparatus which is disclosed in Patent Document 1.

PRIOR ART DOCUMENT

Patent Document

Patent Document 1: Japan Patent Publication No. 8-294249

SUMMARY OF THE INVENTION

Technical Problem

Incidentally, in the vehicle drive apparatus as disclosed in Patent Document 1, when the connection/disconnection sleeve connects the drive gear and the input shaft so as to transmit. the drive power from the rotating electrical machine to the wheels, it is necessary to mainly lubricate the tooth surface of the drive gear, while when the connection/disconnection sleeve disconnects the drive gear and the input shaft such that the drive gear is relatively rotated with respect to the input shaft, it is necessary to mainly lubricate a bearing portion in which the input shaft supports the drive gear such that the drive gear can be relatively rotated. In other words, in the vehicle drive apparatus as disclosed in Patent Document 1, a part which is to be lubricated differs according to whether the connection/disconnection sleeve disconnects or connects the drive gear and the input shaft, and the supply form of a lubricating oil needs to be changed. Although, for example, a vehicle drive apparatus can be considered which has a structure different from the vehicle drive apparatus as disclosed in Patent Document 1 and which selectively disconnects or connects the drive gear and the non-rotating member by the connection/disconnection sleeve, even in the vehicle drive apparatus as described above, the supply form of a lubricating oil needs to be changed according to whether the connection/disconnection sleeve disconnects or connects the drive gear and the non-rotating member.

The present invention is made in view of the foregoing circumstances, and an object thereof is to provide a vehicle drive apparatus which includes a connection/disconnection sleeve that selectively disconnects or connects a drive gear and an input shaft or the drive gear and a non-rotating member and which can switch the supply forms of a lubricating oil according to whether the drive gear and the input shaft or the drive gear and the non-rotating member are disconnected or connected.

SOLUTION TO PROBLEM

To achieve the above object, a first aspect of the present invention provides a vehicle drive apparatus (a) including a rotating electrical machine which serves as a drive power source for a plurality of wheels; an input shaft which is coupled to the rotating electrical machine in a power transmittable manner and rotatably about a first rotation axis; a counter shaft which is provided rotatably about a second rotation axis parallel to the first rotation axis; a drive gear which engages with a gear provided on the counter shaft and which is provided in the input shaft relatively rotatably to the input shaft; and a connection/disconnection sleeve which is driven in a direction of the first rotation axis so as to selectively disconnect or connect the drive gear and the input shaft and the vehicle drive apparatus transmitting drive power from the rotating electrical machine through the input shaft and the counter shaft to the wheels so as to drive the wheels, (b) wherein a lubricating pipe is provided above the connection/disconnection sleeve and has a discharge port through which a lubricating oil is discharged, (c) the drive gear is relatively rotatably supported by the input shaft via a bearing portion provided on the drive gear, and the connection/disconnection sleeve includes a first guide portion guiding the lubricating oil discharged from the discharge port of the lubricating pipe to a tooth surface of the drive gear when the connection/disconnection sleeve is in a first position so as to connect the drive gear and the input shaft; and a second guide portion guiding the lubricating oil discharged from the discharge port of the lubricating pipe to the bearing portion when the connection/disconnection sleeve is in a second position so as to disconnect the drive gear and the input shaft.

Further, to achieve the above object, a second aspect of the present invention provides a vehicle drive apparatus (a) including a rotating electrical machine which serves as a drive power source for a plurality of wheels; an input shaft which is coupled to the rotating electrical machine in a power transmittable manner and rotatably about a first rotation axis; a counter shaft which is provided rotatably about a second rotation axis parallel to the first rotation axis; a drive gear which engages with a gear provided on the counter shaft and which is provided relatively rotatably to the input shaft; and a connection/disconnection sleeve which is driven in a direction of the first rotation axis so as to selectively disconnect or connect the drive gear and a non-rotating member and the vehicle drive apparatus transmitting drive power from the rotating electrical machine through the input shaft and the counter shaft to the wheels so as to drive the wheels, (b) wherein a lubricating pipe is provided above the connection/disconnection sleeve and has a discharge port through which a lubricating oil stored in a tank for storing the lubricating oil is discharged, and (c) the connection/disconnection sleeve includes a discharge portion discharging the lubricating oil from the discharge port of the lubricating pipe when the connection/disconnection sleeve is in a position so as to disconnect the drive gear and the non-rotating member; and a closure portion closing the discharge port of the lubricating pipe when the connection/disconnection sleeve is in a position so as to connect the drive gear and the non-rotating member.

ADVANTAGEOUS EFFECTS OF INVENTION

According to the vehicle drive apparatus recited in the first aspect of the invention, (b) the lubricating pipe that has the discharge port through which the lubricating oil is discharged is provided above the connection/disconnection sleeve, and (c) in the connection/disconnection sleeve, the first guide portion which guides the lubricating oil discharged from the discharge port of the lubricating pipe to the tooth surface of the drive gear when the connection/disconnection sleeve is in the first position so as to connect the drive gear and the input shaft and the second guide portion which guides the lubricating oil discharged from the discharge port of the lubricating pipe to the bearing portion of the drive gear when the connection/disconnection sleeve is in the second position so as to disconnect the drive gear and the input shaft are provided. The bearing portion supports the input shaft such that the drive gear rotates relatively with respect to the input shaft. Hence, when the connection/disconnection sleeve connects the drive gear and the input shaft so as to transmit the drive power from the rotating electrical machine to the wheels, the first guide portion included in the connection/disconnection sleeve guides the lubricating oil discharged from the discharge port of the lubricating pipe to the tooth surface of the drive gear, while when the connection/disconnection sleeve disconnects the drive gear and the input shaft so that the drive gear is relatively rotated with respect to the input shaft, the second guide portion included in the connection/disconnection sleeve guides the lubricating oil discharged from the discharge port of the lubricating pipe to the bearing portion of the drive gear. In this way, the supply form of the lubricating oil is switched according to whether the drive gear and the input shaft are disconnected or connected, and thus it is possible to supply the lubricating oil to a part which to be lubricated.

According to the vehicle drive apparatus recited in the second aspect of the invention, (b) the lubricating pipe that has the discharge port through which the lubricating oil stored in the tank for storing the lubricating oil is discharged is provided above the connection/disconnection sleeve, and (c) the connection/disconnection sleeve is provided with the discharge portion for discharging the lubricating oil from the discharge port of the lubricating pipe when the connection/disconnection sleeve is in the position where the drive gear and the non-rotating member are connected and the closure portion closes the discharge port of the lubricating pipe when the connection/disconnection sleeve is in the position where the drive gear and the non-rotating member are connected. Hence, the supply form of the lubricating oil is switched according to whether the drive gear and the non-rotating member are disconnected or connected, and when the connection/disconnection sleeve connects the drive gear and the non-rotating member so as to mechanically lock the wheels, the closure portion included in the connection/disconnection sleeve closes the discharge port of the lubricating pipe, and thus the lubricating oil which is necessary at the time of restart of a vehicle can be secured in the tank, while when the connection/disconnection sleeve disconnects the drive near and the non-rotating member so as to unlock the wheels, the lubricating oil is discharged from the discharge port of the lubricating pipe via the discharge portion included in the connection/disconnection sleeve, so that the lubricating oil can be supplied.

DESCRIPTION OF THE EMBODIMENT

A third aspect of the present invention provides the vehicle drive apparatus recited in the first aspect of the invention, (a) wherein the lubricating pipe discharges a lubricating oil stored in a tank for storing the lubricating oil from the discharge port, (b) the connection/disconnection sleeve is driven in the direction of the first rotation axis so as to selectively disconnect or connect the drive gear and a non-rotating member provided in the vehicle drive apparatus and (c) the connection/disconnection sleeve includes a closure portion which closes the discharge port of the lubricating pipe when the connection/disconnection sleeve is in a third position so as to connect the drive gear and the non-rotating member. Hence, when the connection/disconnection sleeve is in the third position so as to connect the drive gear and the non-rotating member, and thus the wheels are mechanically locked, the discharge port of the lubricating pipe is closed by the closure portion included in the connection/disconnection sleeve, and the lubricating oil which is necessary at the time of restart of a vehicle is secured in the tank.

A fourth aspect of the present invention provides the vehicle drive apparatus recited in the third aspect of the invention, (a) wherein in the drive gear, a first hub member including a first outer circumferential engagement tooth is integrally provided with the drive gear, (b) a second hub member including a second outer circumferential engagement tooth is integrally provided with the input shaft, (c) a third hub member including a third outer circumferential engagement tooth is integrally provided with the non-rotating member, (d) the connection/disconnection sleeve engages with at least one of the first outer circumferential engagement tooth, the second outer circumferential engagement tooth and the third outer circumferential engagement tooth, (e) the connection/disconnection sleeve, the first hub member, the second hub member and the third hub member are arranged on the first rotation axis and (f) the first outer circumferential engagement tooth, the second outer circumferential engagement tooth and the third outer circumferential engagement tooth have a same outside diameter. Hence, as compared with a case where the first hub member, the second hub member and the third hub member that respectively include the first outer circumferential engagement teeth, the second outer circumferential engagement teeth and the third outer circumferential engagement teeth whose outside diameters are different from each other are provided in the vehicle drive apparatus, an increase in the size of the vehicle drive apparatus in a radial direction of the first rotation axis is suitably suppressed.

A fifth aspect of the present invention provides the vehicle drive apparatus according to the fourth aspect of the invention, (a) wherein the first position is a position in which the connection/disconnection sleeve engages both with the first outer circumferential engagement tooth of the first hub member and with the second outer circumferential engagement tooth of the second hub member, and (b) the third position is a position in which the connection/disconnection sleeve engages both with the first outer circumferential engagement tooth of the first hub member and with the third outer circumferential engagement tooth of the third hub member. Hence, when the connection/disconnection sleeve is arranged in the first position, the drive gear and the input shaft are suitably connected, while when the connection/disconnection sleeve is arranged in the third position, the drive gear and the non-rotating member are suitably connected.

A sixth aspect of the present invention provides the vehicle drive apparatus recited in any one of the third to fifth aspects of the invention, comprising an actuator which moves the connection/disconnection sleeve in the direction of the first rotation axis selectively to one of the first position, the second position and the third position. Hence, it is possible to suitably move the connection/disconnection sleeve to any one of the first position, the second position and the third position with the actuator.

A seventh aspect of the present invention provides the vehicle drive apparatus recited in any one of the first, third to sixth aspects of the invention, (a) wherein a lubricating oil path formed in the connection/disconnection sleeve is provided with the first guide portion, and (b) the lubricating oil discharged from the lubricating pipe is passed through the lubricating oil path and is guided to the tooth surface of the drive gear. Hence, when the drive gear and the input shaft are connected by the connection/disconnection sleeve, the lubricating oil discharged from the discharge port of the lubricating pipe is suitably guided to the tooth surface of the drive gear.

An eighth aspect of the present invention provides the vehicle drive apparatus recited in any one of the first, third to seventh aspects of the invention, (a) wherein a tapered portion formed at an end portion of the connection/disconnection sleeve in the direction of the first rotation axis is provided with the second guide portion, and (b) the lubricating oil discharged from the lubricating pipe is led by the tapered portion to the bearing portion of the drive gear. Hence, when the drive gear and the input shaft are disconnected by the connection/disconnection sleeve, the lubricating oil discharged from the discharge port of the lubricating pipe is suitably guided to the bearing portion of the drive gear.

A ninth aspect of the present invention provides the vehicle drive apparatus recited in any one of the third to eighth aspects of the invention, (a) wherein an annular portion formed at the end portion of the connection/disconnection sleeve in the direction of the first rotation axis is provided with the closure portion, and (b) when the connection/disconnection sleeve is arranged at the third position, the discharge port of the lubricating pipe is blocked by a part of an outer circumferential surface of the annular portion. Hence, when the drive gear and the non-rotating member are connected by the connection/disconnection sleeve, the discharge port of the lubricating pipe is suitably closed.

An embodiment of the present invention will be described in detail below with reference to drawings r In the embodiment described below, the drawings are simplified or deformed as necessary, and thus the ratios of the dimensions, the shapes and the like of individual portions are not necessarily accurately drawn.

Embodiment 1

Figure 1:
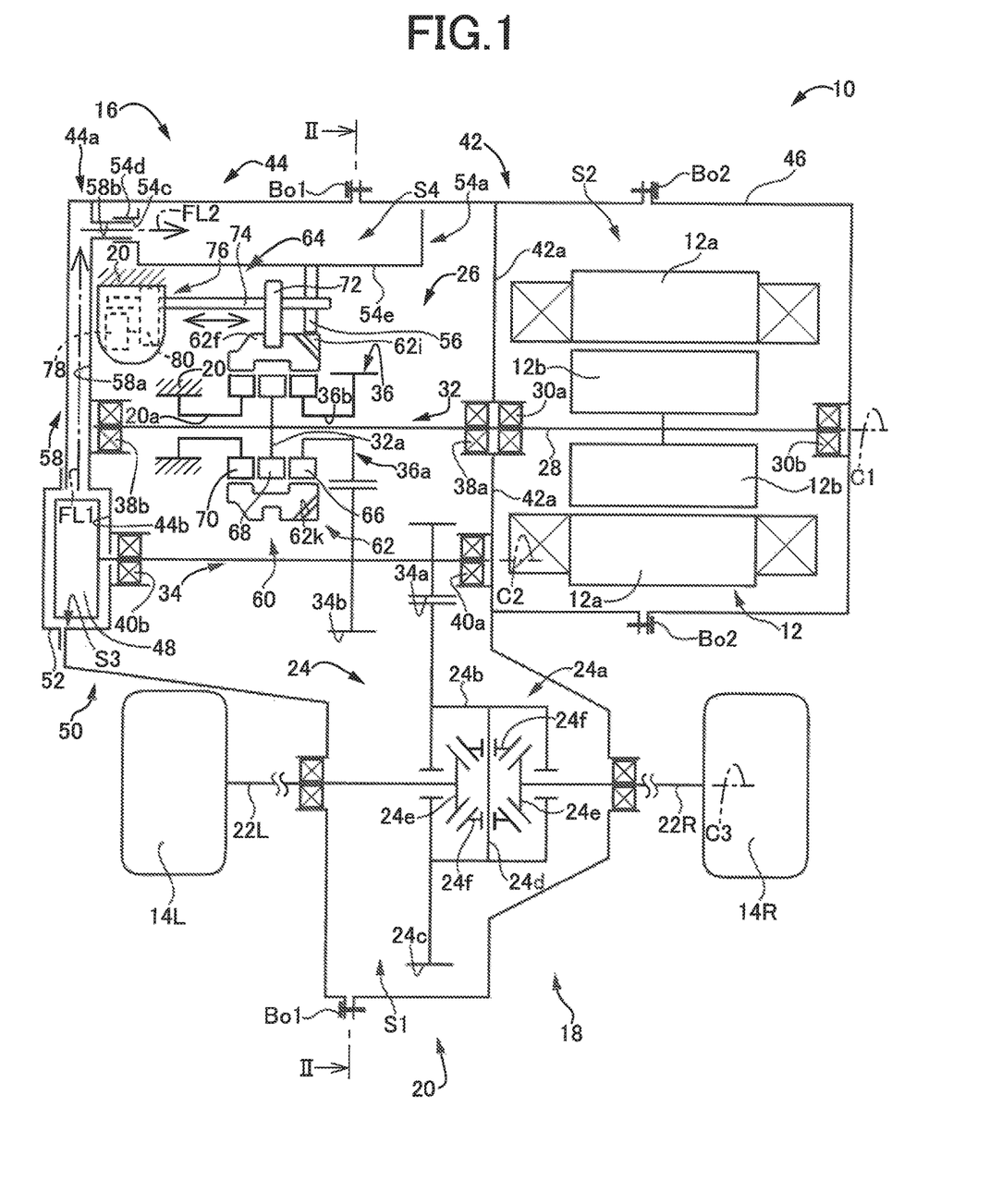
FIG. 1 is a diagram illustrating the configuration of a front wheel drive apparatus of an electric vehicle to which the present invention is suitably applied.

FIG. 1 is a diagram illustrating the configuration of an electric vehicle 10 to which the present invention is suitably applied. The electric vehicle 10 includes a front wheel drive apparatus (vehicle drive apparatus) 16 which drives a pair of left and right front wheels (a plurality of wheels) 14L and 14R by an electric motor (rotating electrical machine) 12 that is a drive power source for running. As shown in FIG. 1, the front wheel drive apparatus 16 includes; the electric motor 12; a power transmission mechanism 18 which transmits drive power from the electric motor 12 to the pair of left and right front wheels 14L and 14R; a storage casing 20 which stores the electric motor 12, the power transmission mechanism 18 and the like; and drive shafts 22l, and 22R which are rotated together with the pair of left and right front wheels 14L and 14R. In the power transmission mechanism 18, a differential device 24 which is coupled to the pair of left and right front wheels 14L and 14R such that the drive power can be transmitted thereto through the drive shafts 22L and 22R and a reduction gear mechanism 26 which is provided in a power transmission path between the differential device 24 and the electric motor 12 are provided. The electric motor 12 also serves as a drive power source for the pair of left and right front wheels 14L and 14R.

As shown in FIG. 1, for example, the electric motor 12 includes: a cylindrical stator 12a which is fixed to the storage casing 20; and a cylindrical rotor 12b which is fixed to a rotor shaft 28 inside the cylindrical stator 12a with a predetermined distance apart. The rotor shaft 28 which penetrates and is integrally fixed to the cylindrical rotor 12b is supported through a pair of first bearings 30a and 30b on the storage casing 20 such that the rotor shaft 28 can be rotated about a first rotation axis C1.

As shown in FIG. 1, the differential device 24 includes: a differential casing 24a which is supported so as to rotate about a third rotation axis C3 and which is formed in the shape of a container; a differential ring gear 24c which is fixed to an outer circumferential portion 24b of the differential casing 24a; a cylindrical pinion shaft 24d whose both end portions are supported by the differential casing 24a and which is fixed with an unillustrated knock pin to the differential casing 24a in a posture perpendicular to the third rotation axis C3 of the differential casing 24a; a pair of side gears 24e which are arranged opposite each other through the pinion shaft 24d so as to rotate about the third rotation axis C3 and which are stored within the differential casing 24a; and a pair of pinions 24f which are rotated together with the differential casing 24a in a state where the pinions 24f are rotatably supported by the pinion shaft 24d which is inserted through the pair of pinions 24f and the pair of pinions 24f engage with the pair of side gears 24e. When the drive power from the electric motor 12 is input through the reduction gear mechanism 26 to the differential ring gear 24c, the differential device 24 configured as described above distributes the input torque from the electric motor 12 to the pair of left and right front wheels 14L and 14R while allowing a differential rotation of the pair of side gears 24e which are rotated together with the pair of left and right drive shafts 22L and 22R.

As shown in FIG. 1, the reduction gear mechanism 26 includes: an input shaft 32 which is connected to the rotor shaft 28 provided in the electric motor 12 such that the rotor shaft 28 transmits the drive power to the input shaft 32 and to which the drive power from the electric motor 12 is input; a small diameter gear 34a which engages with the differential ring gear 24c provided in the differential device 24; a large diameter gear (gear) 34b which has a diameter larger than the small diameter gear 34a and which engages with a drive gear 36 That will be described later; and a counter shaft 34 to which the small diameter gear 34a and the large diameter gear 34b are integrally fixed in the reduction gear mechanism 26, the input shaft 32 is supported by the storage casing 20 through a pair of second bearings 38a and 38b provided at both end portions of the input shaft 32 such that the input shaft 32 rotates about the first rotation axis C1, that is, such that the input shaft 32 rotates about the rotation axis C1 the same as with the rotor shaft 28 provided in the electric motor 12. The counter shaft 34 is supported by the storage casing 20 through a pair of third bearings 40a and 40b provided at both end portion of the counter shaft 34 such that the counter shaft 34 rotates about a second rotation axis C2. The drive gear 36 engages with the large diameter gear 34b which is integrally provided in the counter shaft 34 and is supported by The input shaft 32 such that the drive gear 36 relatively rotates with respect to the input shaft 32. The first rotation axis C1, the second rotation axis C2 and the third rotation axis C3 are arranged parallel to each other.

As shown in FIG. 1, the storage casing 20 includes: a first casing member 42; a second casing member 44 which is integrally fixed with a first fastening bolt Bo1 to the first casing member 42; and a third casing member 46 which is integrally fixed with a second fastening bolt Bo2 to the first casing member 42. In the storage casing 20, a first storage space S1 which is defined with the first casing member 42 and the second casing member 44 and a second storage space S2 which is defined with the first casing member 42 and the third casing member 46 are formed, in the first storage space S1, the power transmission mechanism 18, such as the reduction gear mechanism 26 and the differential device 24, and the like are stored and in the second storage space S2, the electric motor 12 and the like are stored. In the first casing member 42, a partition wall 42a is formed which partitions the first storage space S1 and the second storage space S2, and in the second casing member 44, a wall portion 44a which is opposite to the partition wall 42a formed in the first casing member 42 is formed.

As shown in FIG. 1, in the front wheel drive apparatus 16, a lubrication path (lubrication structure) 50 is provided which supplies with, for example, a mechanical oil pump 48 an oil (lubricating oil) OIL (see FIG. 2) that is stored in the storage casing 20 to the power transmission mechanism 18 so as to lubricate the power transmission mechanism 18 and the like.

The mechanical oil pump 48 is, for example, an internal gear type oil pump. As shown in FIG. 1, the mechanical oil Pump 48 includes: a pump chamber S3 which is defined with the wall portion 44a of the second casing member 44 and a pump cover 52 attached to the wall portion 44a of the second casing member 44; an annular inner rotor (unillustrated) which includes a plurality of outer teeth, which is coupled to the counter shaft 34 so as to be able to transmit power thereto and which is supported so as to be able to be rotated about the second rotation axis C2; and an annular outer rotor (unillustrated) which includes a plurality of inner teeth that engage with the outer teeth of the inner rotor and which is supported so as to be able to be rotated about a rotation axis which is made eccentric from the second rotation axis C2 by a concave portion 44b formed in the wall portion 44a of the second casing member 44.

As shown in FIG. 1, the lubrication path 50 includes: a catch tank (tank) 54 which stores the oil (lubricating oil) OIL; a lubricating pipe 56 (see FIGS. 2 and 3) which discharges the oil OIL stored in the catch tank 54 from a discharge port 56a; and a supply oil path 58 which supplies the oil OIL, which is discharged from the mechanical oil pump 48, to the catch tank 54.

As shown in FIG. 1, the supply oil path 58 includes: a discharge oil path 58a which is formed in the wall portion 44a of the second casing member 44 along the wall portion 44a and which is connected to an unillustrated discharge port in the mechanical oil pump 48; and a branch oil path 58b which is branched from the discharge oil path 58a and which supplies the oil OIL, which is discharged from the mechanical oil pump 48, to the catch tank 54. Arrows FL1 and FL2 shown in FIG. 1 indicate the flow of the oil OIL which is discharged from the mechanical oil pump 48.

Figure 2:
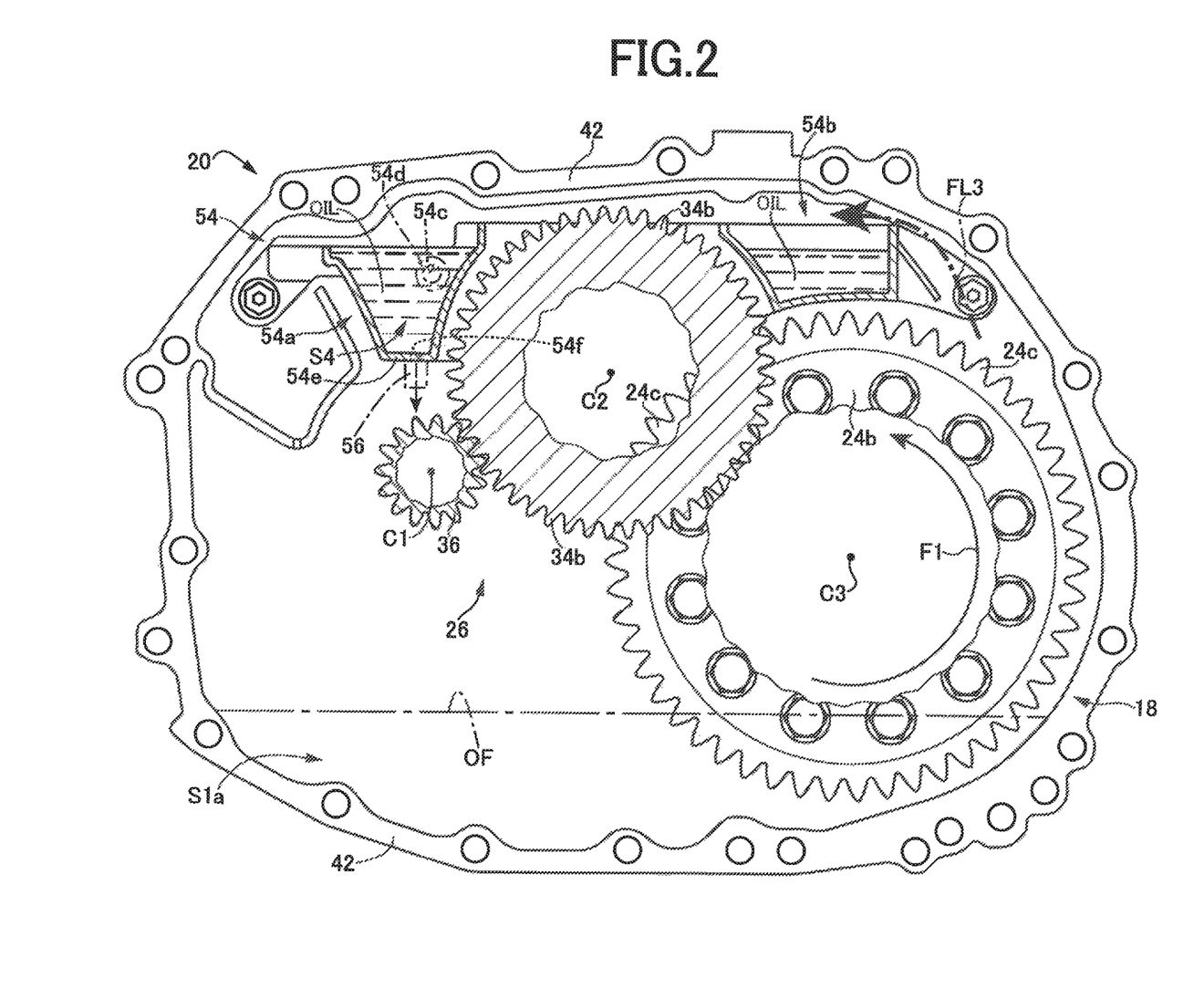
FIG. 2 is a cross-sectional view taken along line II-II in FIG. 1 and a diagram illustrating the configuration of a catch tank which is provided in the front wheel drive apparatus of FIG. 1.

As shown in FIG. 2, the catch tank 54 includes: a first storage portion 54a which stores the oil OIL discharged from the mechanical oil pump 48; a second storage portion 54b which stores the oil OIL that is lifted (splashed up) by a rotation of the differential ring gear 24c of the differential device 24 about the third rotation axis C3 in a direction of an arrow F1 when the vehicle runs forward; and a distribution portion (unillustrated) which distributes the oil OIL stored in the first storage portion 54a and the oil OIL stored in the second storage portion 54b respectively. In FIG. 2, an oil surface OF which is represented by an alternate long and short dashed line is a line which represents an oil surface of the oil OIL stored in a storage space Sla of the storage casing 20, for example, when the vehicle runs forward. An arrow FL3 shown in FIG. 2 indicates the flow of the oil OIL which is lifted by the rotation of the differential ring gear 24c in the direction of the arrow F1.

As shown in FIGS. 1 and 2, a cylindrical portion 54d which is formed in the shape of a cylinder is provided so as to be fixed to the first storage portion 54a of the catch tank 54, and in the cylindrical portion 54d, a communication hole 54c is formed which makes the branch oil path 58b formed in the wall portion 44a of the second casing member 44 and a storage space S4 in the first storage portion 54a of the catch tank 54 communicate with each other. In a bottom portion 54e of the first storage portion 54a of the catch tank 54, a release hole 54f (see FIG. 2) is formed through which the oil OIL stored in the first storage portion 54a is released, and the lubricating pipe 56 is connected to the release hole 54f. Within the storage casing 20, the first storage portion 54a of the catch tank 54 is arranged higher than the lubricating pipe 56 in a vertical direction, that is, is arranged higher than the discharge port 56a of the lubricating pipe 56 in the vertical direction, and the oil OIL stored in the first storage portion 54a of the catch tank 54 is discharged from the discharge port 56a of the lubricating pipe 56, for example, by the weight of the oil OIL itself.

As shown in FIG. 1, the power transmission mechanism 18 includes a connection/disconnection device 60 which selectively disconnects or connects a power transmission path between the drive gear 36 and the input shaft 32. As will be described later, the connection/disconnection device 60 also has the function of selectively disconnecting or connecting the drive gear 36 and a non-rotating member such as the storage casing 20 which is provided in the front wheel drive apparatus 16.

As shown in FIG. 1, the connection/disconnection device 60 includes: a ring-shaped connection/disconnection sleeve 62 which is driven in the direction of the first rotation axis C1 so as to selectively disconnect or connect the drive gear 36 and the input shaft 32 or the drive gear 36 and the storage casing 20 that is the non-rotating member; and an actuator 64 which moves the connection/disconnection sleeve 62 in the direction of the first rotation axis C1.

Figure 4:
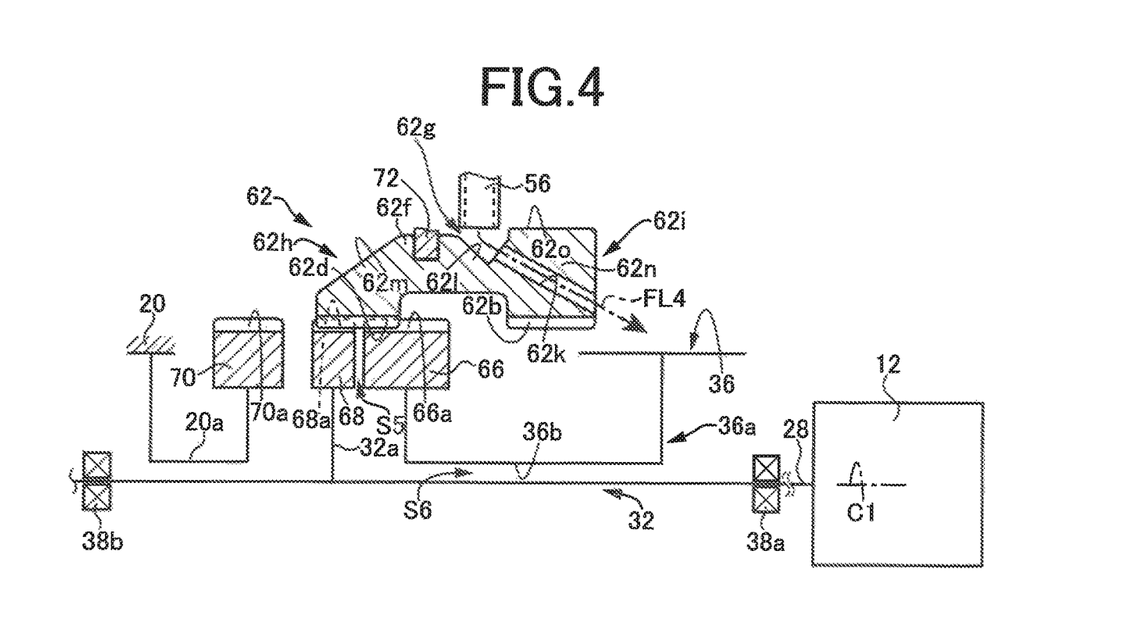
FIG. 4 is a diagram illustrating the flow of an oil discharged from a lubricating pipe when the connection/disconnection sleeve shown in FIG. 3 is in a first position so as to connect a drive gear and an input shaft.

As shown in FIGS. 1 and 4, the drive gear 36 is integrally provided with an annular first hub member 66 in which a plurality of first outer circumferential engagement teeth 66a are formed in an outer circumference and a first coupling portion 36a which couples the first hub member 66 and the drive gear 36 such that power can be transmitted. The input shaft 32 is integrally provided with an annular second hub member 68 in which a plurality of second outer circumferential engagement teeth 68a are formed in an outer circumference and a second coupling portion 32a which couples the second hub member 68 and the input shaft 32 such that power can be transmitted. The storage casing 20 which is the non-rotating member is integrally provided with an annular third hub member 70 in which a plurality of third outer circumferential engagement teeth 70a are formed in an outer circumference and a third coupling portion. 20a which couples the third hub member 70 and the storage casing 20. As shown in FIG. 1, the connection/disconnection sleeve 62, the first hub member 66, the second hub member 68 and the third hub member 70 are arranged on the first rotation axis C1, and the first hub member 66, the second hub member 68 and the third hub member 70 are arranged from the side of the drive gear 36 in the direction of the first rotation axis C1 in the order of the first hub member 66, the second hub member 68 and the third hub member 70. The first outer circumferential engagement teeth 66a, the second outer circumferential engagement teeth 68a and the third outer circumferential engagement teeth 70a have the same outside diameter. As shown in FIG. 4, in the first coupling portion 36a of the drive gear 36, a cylindrical bearing portion 36b is formed which is received by the input shaft 32 and in which the input shaft 32 supports the drive gear 36 such that the drive gear 36 rotates relative to the input shaft 32. In the present embodiment, a metal bearing is provided between the bearing portion 36b of the drive gear 36 and the input shaft 32, for example, the bearing portion 36b of the drive gear 36 is brought into sliding contact with the input shaft 32 through the metal bearing and the metal bearing functions as, for example, a sliding portion for the drive gear 36 and the input shaft 32. A needle bearing may be provided between the bearing portion 36b of the drive gear 36 and the input shaft 32, instead of the metal bearing, for example. The bearing portion 36b of the drive gear 36 itself may support the input shaft 32 while the bearing portion 36b permits a differential rotation between the drive gear 36 and the input shaft 32.

As shown in FIGS. 3 to 6, the connection/disconnection sleeve 62 includes: a plurality of first engagement teeth 62b which are formed in an inner circumference of an end portion 62a of the connection; disconnection sleeve 62 on the side of the drive gear 36 in the direction of the first rotation axis C1 and which can. engage with the first outer circumferential engagement teeth 66a formed in the first hub member 66; and a plurality of second engagement teeth (engagement teeth) 62d which are formed in an inner circumference of an end portion 62c of the connection/disconnection sleeve 62 on the side opposite to the side of the drive gear 36 in the direction of the first rotation axis C1 and which can engage with at least one of the first outer circumferential engagement teeth 66a, the second outer circumferential engagement teeth 68a and the third outer circumferential engagement teeth 70a.

As shown in FIG. 1, the actuator 64 includes: a shift fork 72 which is coupled to a fork coupling portion 62f formed in an intermediate portion 62e (see FIG. 3) of the connection/disconnection sleeve 62 in the direction of the first rotation axis C1; a fork shaft 74 to which the shift fork 72 is coupled; and a movement device 76 which moves the fork shaft 74 in a direction parallel to the first rotation axis C1, that is, in a direction of an axis center of the fork shaft 74. As shown in FIG. 1, the movement device 76 includes, for example, an electric motor 78 and a screw mechanism 80 which converts the rotation movement of the electric motor 78 into a linear movement, and in the movement device 76, the fork shaft 74, that is, the shift fork 72 can be moved to a predetermined position in the direction of the axis center of the fork shaft 74 according to an amount of rotation of the electric motor 78. In the actuator 64 configured as described above, the mount of rotation of the electric motor 78 provided in the movement device 76 is controlled by an unillustrated electronic control device, and thus the connection/disconnection sleeve 62 can be selectively moved to a preset position, for example, a first position, a second position or a third position in the direction of the first rotation axis C1.

As shown in FIG. 4, the first position is a position in which the second engagement teeth 62d of the connection/disconnection sleeve 62 engage both with the first outer circumferential engagement teeth 66a formed in the first hub member 66 and with the second outer circumferential engagement teeth 68a formed in the second hub member 68, and when the connection/disconnection sleeve 62 is moved by the actuator 64 to the first position, the drive gear 36 and the input shaft 32 are connected, the drive power from the electric motor 12 is transmitted through the input shaft 32 and the counter shaft 34, that is, the power transmission mechanism 18 to the pair of left and right front wheels 14L and 14R.

Figure 5:
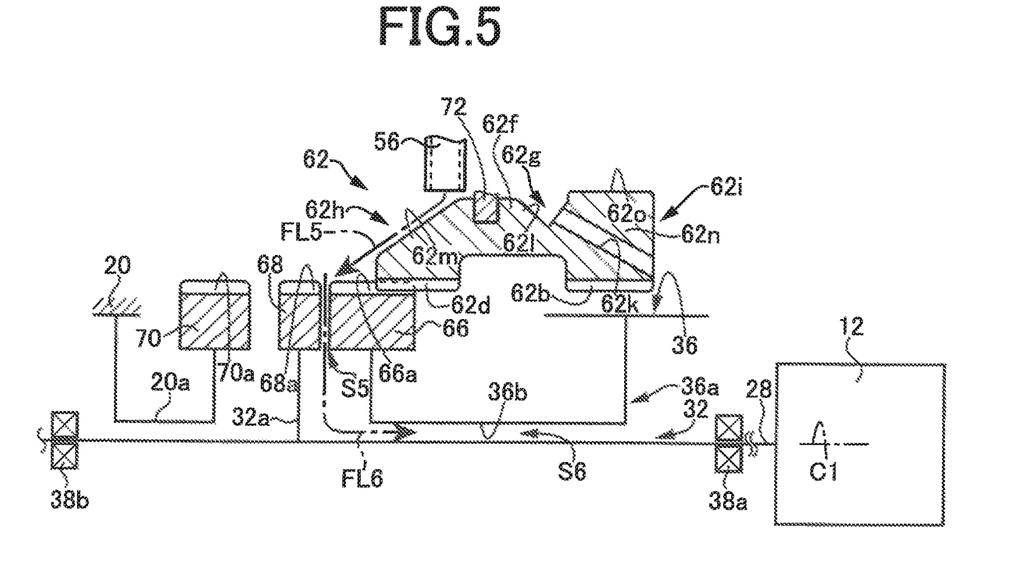
FIG. 5 is a diagram illustrating the flow of an oil discharged from the lubricating pipe when the connection/disconnection sleeve shown in FIG. 3 is in a second position so as to disconnect the drive gear and the input shaft.

As shown in FIG. 5, the second position is a position in which the second engagement teeth 62d of the connection/disconnection sleeve 62 engage with only the first outer circumferential engagement teeth 66a formed in the first hub member 66, and when the connection/disconnection sleeve 62 is moved by the actuator 64 to the second position, the drive gear 36 and the input shaft 32 are disconnected, and thus the drive gear 36 is relatively rotated with respect to the input shaft 32.

Figure 6:
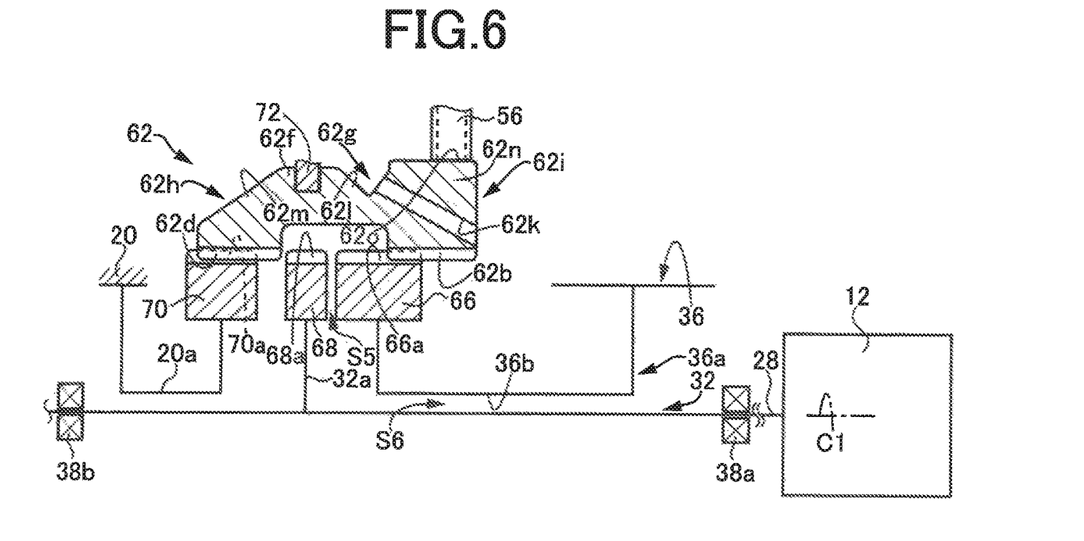
FIG. 6 is a diagram showing a state where the discharge port of the lubricating pipe is closed by the connection/disconnection sleeve when the connection/disconnection sleeve shown in FIG. 3 is in a third position so as to connect the drive gear and a non-rotating member.

As shown in FIG. 6, the third position is a position in which the first engagement teeth 62b of the connection/disconnection sleeve 62 engage with the first outer circumferential engagement teeth 66a formed in the first hub member 66 and in which the second engagement teeth 62d of the connection/disconnection sleeve 62 engage with the third outer circumferential engagement teeth 70a formed in the third hub member 70, and when the connection/disconnection sleeve 62 is moved by the actuator 64 to the third position, the drive gear 36 and the storage casing 20 which is the non-rotating member are connected, and thus the pair of left and right front wheels 14L and 14R are mechanically locked. In the connection/disconnection device 60, when the connection/disconnection sleeve 62 is moved by the actuator 64 to the first position or the second position while the connection/disconnection sleeve 62 is in the third position, the drive gear 36 and the storage casing 20 which is the non-rotating member are disconnected, and thus the pair of left and right front wheels 14L and 14R are unlocked.

As shown in FIGS. 3 to 6, the connection/disconnection sleeve 62 includes: a first guide portion 62g which guides the oil OIL discharged from the discharge port 56a of the lubricating pipe 56 to a tooth surface of the drive gear 36 when the connection/disconnection sleeve 62 is in the first position so as to connect the drive gear 36 and the input shaft 32; a second guide portion 62h which guides the oil OIL discharged from the discharge port 56a of the lubricating pipe 56 to the bearing portion 36b in the drive gear 36 when the connection/disconnection sleeve 62 is in the second position so as to disconnect the drive gear 36 and the input shaft 32; and a closure portion 62i which closes the discharge port 56a of the lubricating pipe 56 when the connection/disconnection sleeve 62 is in the third position so as to connect the drive gear 36 and the storage caging 20 which is the non-rotating member. The first guide portion 62g and the second guide portion 62h formed in the connection/disconnection sleeve 62 function as discharge portions which discharge the oil OIL from the discharge port 56a of the lubricating pipe 56 when the connection/disconnection sleeve 62 is in the position so as to disconnect the drive gear 36 and the storage casing 20, that is, when the connection/disconnection sleeve 62 is in the first position or in the second position. The lubricating pipe 56 is arranged. within the storage casing 20 higher than the connection/disconnection sleeve 62 in the vertical direction, that is, the discharge port 56a of the lubricating pipe 56 is arranged within the storage casing 20 higher than the connection/disconnection sleeve 62 in the vertical direction.

Figure 3:
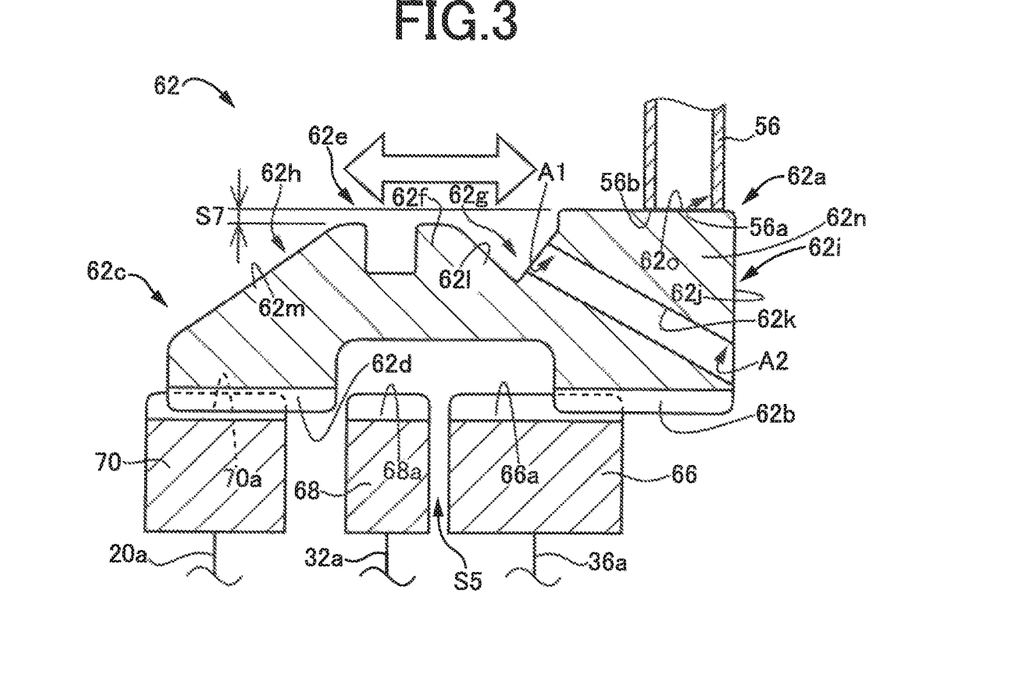
FIG. 3 is a cross-sectional view illustrating the configuration of a connection/disconnection sleeve provided in the front wheel drive apparatus of FIG. 1.

As shown in FIGS. 3 and 4, the first guide portion 62g of the connection/disconnection sleeve 62 includes: a plurality of lubricating oil paths 62k which makes a first opening A1 (see FIG. 3) formed in a part of the intermediate portion 62e of the connection/disconnection sleeve 62 communicate with a second opening A2 (see FIG. 3) formed in a part of a side surface 62j of the connection/disconnection sleeve 62 on the side of the drive gear 36 in the direction of the first rotation axis C1; and a tapered guide portion 62l which guides the oil OIL discharged from the discharge port 56a of the lubricating pipe 56 to the first opening A1 of the lubricating oil paths 62k when the connection/disconnection sleeve 62 is in the first position as shown in FIG. 4. In the first guide portion 62g of the connection/disconnection sleeve 62 configured as described above, when the connection/disconnection sleeve 62 is in the first position as shown in FIG. 4, the oil OIL discharged from the discharge port 56a of the lubricating pipe 56 is passed through the lubricating oil paths 62k formed in the connection/disconnection sleeve 62 and is guided to the tooth surface of the drive gear 36. An arrow FL4 shown in FIG. 4 indicates the flow of the oil OIL discharged from the lubricating pipe 56 when the connection/disconnection sleeve 62 is in the first position.

As shown in FIGS. 3 to 5, the second guide portion 62b of the connection/disconnection sleeve 62 includes a tapered portion 62m which is formed in a tapered shape at the end portion 62c (see FIG. 3) of the connection/disconnection sleeve 62 on the side opposite to the side of the drive gear 36 in the direction of the first rotation axis C1. In the second guide portion 62b of the connection/disconnection sleeve 62 configured as described above, when the connection/disconnection sleeve 62 is in the second position as shown in FIG. 5, the oil OIL discharged from the discharge port 56a of the lubricating pipe 56 is guided into a gap (space) S5 between the first hub member 66 and the second hub member 68 by the tapered portion 62m formed in the connection/disconnection sleeve 62, and the oil OIL guided into the gap S5 is led to the bearing portion 36b of the drive gear 36, that is, a gap 56 between the bearing portion 36b of the drive gear 36 and the input shaft 32. Arrows FL5 and FL6 shown in FIG. 5 indicate the flow of the oil OIL discharged from the lubricating pipe 56 when the connection/disconnection sleeve 62 is in the second position.

As shown in FIGS. 3 and 6, the closure portion 62i of the connection/disconnection sleeve 62 includes an annular portion 62n which is formed into an annular shape at the end portion 62a (see FIG. 3) of the connection/disconnection sleeve 62 on the side of the drive gear 36 in the direction of the first rotation axis C1. In the annular portion 62n formed in the connection/disconnection sleeve 62, the position of the lubricating pipe 56 and the size of the annular portion 62n in a radial direction are set such that a gap is prevented from being formed between a tip end 56b of the lubricating pipe 56 and an outer circumferential surface 62o of the annular portion 62n when the connection/disconnection sleeve 62 is in the third position as shown in FIG. 3. In the connection/disconnection sleeve 62, the position of the lubricating pipet 56 and the size of the connection/disconnection sleeve 62 in the radial direction are set such that a gap S7 (see FIG. 3) is formed between the tip end 56b of the lubricating pipe 56 and the outer circumference of the connection/disconnection sleeve 62 when the connection/disconnection sleeve 62 is not in the third position, for example, when the connection/disconnection sleeve 62 is in the first position or in the second position. In the closure portion 62i of the connection/disconnection sleeve 62 configured as described above, when the connection/disconnection sleeve 62 is in the third position as shown in FIGS. 3 and 6, the discharge port 56a of the lubricating pipe 56 is blocked by a part of the outer circumferential surface 62o of the annular portion 62n formed in the connection, disconnection sleeve 62, and the release of the oil OIL stored in the catch tank 54 from the release hole 54f is suppressed.

For example, when a normal running mode of the electric vehicle 10 in which a driver depresses an unillustrated accelerator pedal so as to transmit the drive power from the electric motor 12 through the power transmission mechanism 18 to the pair of left and right front wheels 14L and 14R and to run is selected by an unillustrated electronic control device, the actuator 64 is controlled by the electronic control device such that the connection/disconnection sleeve 62 is moved to the first position. For, example, when a free-run mode of the electric vehicle 10 in which the accelerator is turned off at a predetermined vehicle speed or higher so as to disconnect the electric motor 12 from the front wheels 14L and 14R, to stop the rotation of the electric motor 12 and to perform coasting is selected by the electronic control device, the actuator 64 is controlled by the electronic control device such that the connection/disconnection sleeve 62 is moved to the second position. For example, when a parking lock mode of the electric vehicle 10 in which an unillustrated shift lever is switched to a parking position at the time of stop of the vehicle 10 so as to mechanically lock the front wheels 14L and 14R is selected by the electronic control device, the actuator 64 is controlled by the electronic control device such that the connection/disconnection sleeve 62 is moved to the third position. When the free-run mode is switched to the normal running mode, that is, when the connection/disconnection sleeve 62 is moved by the actuator 64 from the second position to the first position, for example, a rotation speed of the second hub member 68 which is coupled to the input shaft 32 is increased by the electric motor 12 to a rotation speed of the first hub member 66 coupled to the drive gear 36, and then the connection/disconnection sleeve 62 is moved from the second position to the first position.

In the front wheel drive apparatus 16 configured as described above, for example, when the normal running mode is selected by the electronic control device, the connection/disconnection sleeve 62 is moved by the actuator 64 to the first position, and thus as shown in FIG. 4, the oil OIL discharged from the discharge port 56a of the lubricating pipe 56 is guided to the tooth surface of the drive gear 36 by the first guide portion 62g included in the connection/disconnection sleeve 62. For example, when the free-run mode is selected by the electronic control device, the connection/disconnection sleeve 62 is moved by the actuator 64 to the second position, and thus as shown in FIG. 5, the oil OIL discharged from the discharge port 56a of the lubricating pipe 56 is guided to the bearing portion 36b of the drive gear 36 by the second guide portion 62h included in the connection/disconnection sleeve 62. For example, when the parking lock mode is selected by the electronic control device, the connection/disconnection sleeve 62 is moved by the actuator 64 to the third position, and thus as shown in FIG. 6, the discharge port 56a of the lubricating pipe 56 is blocked by the closure portion 62i included in the connection/disconnection sleeve 62, and the oil OIL which is necessary at the time of restart of the vehicle 10 is secured in the catch tank 54.

As described above, according to the front wheel drive apparatus 16 of the present embodiment, the lubricating pipe 56 that has the discharge port 56a through which the oil OIL is discharged is provided above the connection/disconnection sleeve 62, and in the connection/disconnection sleeve 62, the first guide portion 62g which guides the oil OIL discharged from the discharge port 56a of the lubricating pipe 56 to the tooth surface of the drive gear 36 when the connection/disconnection sleeve 62 is in the first position so as to connect the drive gear 36 and the input shaft 32 and the second guide portion 62h which guides the oil OIL discharged from the discharge port 56a of the lubricating pipe 56 to the bearing portion 36b of the drive gear 36 when the connection/disconnection sleeve 62 is in the second position so as to disconnect the drive gear 36 and the input shaft 32 are provided. Hence, when the connection/disconnection sleeve 62 connects the drive gear 36 and the input shaft 32 so as to transmit the drive power from the electric motor 12 to the pair of left and right front wheels 14L and 14R, the first guide portion 62g included in the connection/disconnection sleeve 62 guides the oil OIL discharged from the discharge port 56a of the lubricating pipe 56 to the tooth surface of the drive gear 36, while when the connection/disconnection sleeve 62 disconnects the drive gear 36 and the input shaft 32 so that the drive gear 36 is relatively rotated with respect to the input shaft 32, the second guide portion 62h included in the connection/disconnection sleeve 62 guides the oil OIL discharged from the discharge port 56a of the lubricating pipe 56 to the hearing portion 36b of the drive gear 36. In this way, the supply form of the oil OIL is switched according to whether the drive gear 36 and the input shaft 32 are disconnected or connected without additional provision of a lubricating oil switching device for switching the supply form of the lubricating oil, and thus it is possible to supply the oil OIL to a part which is to be lubricated.

According to the front wheel drive apparatus 16 of the present embodiment, the lubricating pipe 56 that has the discharge port 56a through which the oil OIL stored in the catch tank 54 for storing the oil OIL is discharged is provided above the connection/disconnection sleeve 62, and the connection/disconnection sleeve 62 is provided with the first guide portion. 62g or the second guide portion 62h which is the discharge portion for discharging the oil OIL from the discharge port 56a of the lubricating pipe 56 when the connection/disconnection sleeve 62 is in the position where the drive gear 36 and the storage casing 20 which is the non-rotating member are disconnected, that is, when the connection/disconnection sleeve 62 is in the first position or in the second position and the closure portion 62i which closes the discharge port 56a of the lubricating pipe 56 when the connection/disconnection sleeve 62 is in the position where the drive gear 36 and the storage casing 20 which is the non-rotating member are connected, that is, when the connection/disconnection sleeve 62 is in the third position. Hence, the supply form of the oil OIL, is switched according to whether the drive gear 36 and the storage casing 20 which is the non-rotating member are disconnected or connected without additional provision of the lubricating oil switching device for switching the supply form of the lubricating oil, and when the connection/disconnection sleeve 62 connects the drive gear 36 and the storage casing 20 which is the non-rotating member so as to mechanically lock the pair of left and right front wheels 14L and 14R, the closure portion 62i included in the connection/disconnection sleeve 62 closes the discharge port 56a of the lubricating pipe 56, and thus the oil OIL which is necessary at the time of restart of the vehicle 10 can be secured in the catch tank 54, while when the connection/disconnection sleeve 62 disconnects the drive gear 36 and the storage casing 20 which is the non-rotating member so as to unlock the pair of left and right front wheel's 14L and 14R, the oil OIL is discharged from the discharge port 56a of the lubricating pipe 56 via the first guide portion. 62g or the second guide portion 62h which is the discharge portion included in the connection/disconnection sleeve 62, so that the oil OIL can be supplied.

According to the front wheel drive apparatus 16 of the present embodiment, the drive gear 36 is integrally provided with the first hub member 66 which includes the first outer circumferential engagement teeth 66a, the input shaft 32 is integrally provided with the second hub member 68 which includes the second outer circumferential engagement teeth 68a, the storage casing 20 which is the non-rotating member is integrally provided with the third hub member 70 which includes the third outer circumferential engagement teeth 70a, the connection/disconnection sleeve 62 can engage with at least one of the first outer circumferential engagement teeth 66a, the second outer circumferential engagement teeth 68a and the third outer circumferential engagement teeth 70a, the connection/disconnection sleeve 62, the first hub member 66, the second hub member 68 and the third hub member 70 are arranged on the first rotation axis C1 and the first outer circumferential engagement teeth 66a, the second outer circumferential engagement teeth 68a and the third outer circumferential engagement teeth 70a have the same outside diameter. Hence, as compared with a case where the first hub member 66, the second hub member 68 and the third hub member 70 that respectively include the first outer circumferential engagement teeth 66a, the second outer circumferential engagement teeth 68a and the third outer circumferential engagement teeth 70a whose outside diameters are different from each other are provided in the front wheel drive apparatus 16, an increase in the size of the front wheel drive apparatus 16 in a radial direction of the first rotation axis C1 is suitably suppressed.

According to the front wheel drive apparatus 16 of the present embodiment, the first position of the connection/disconnection sleeve 62 is a position in which the connection/disconnection sleeve 62 engages both with the first outer circumferential engagement teeth 66a of the first hub member 66 and with the second outer circumferential engagement teeth 68a of the second hub member 68, and the third position of the connection/disconnection sleeve 62 is a position in which the connection/disconnection sleeve 62 engages both with the first. outer circumferential engagement teeth 66a of the first hub member 66 and with the third outer circumferential engagement teeth 70a of the third hub member 70. Hence, when the connection/disconnection sleeve 62 is arranged in the first position, the drive gear 36 and the input shaft 32 are suitably connected, while when the connection/disconnection sleeve 62 is arranged in the third position, the drive gear 36 and the storage casing 20 which is the non-rotating member are suitably connected.

According to the front wheel drive apparatus 16 of the present embodiment, the front wheel drive apparatus 16 includes the actuator 64 which moves the connection/disconnection sleeve 62 in the direction of the first rotation axis C1 such that the connection; disconnection sleeve 62 is selectively moved to any one of the first position, the second position and the third position. Hence, it is possible to suitably move the connection/disconnection sleeve 62 to any one of the first position, the second position and the third position with the actuator 64.

According to the front wheel drive apparatus 16 of the present embodiment, the lubricating oil paths 62k formed in the connection/disconnection sleeve 62 are provided in the first guide portion 62g, and the oil OIL discharged from the lubricating pipe 56 is passed through the lubricating oil paths 62k and is guided to the tooth surface of the drive gear 36. Hence, when the drive gear 36 and the input shaft 32 are connected by the connection/disconnection sleeve 62, the oil OIL discharged from the discharge port 56a of the lubricating pipe 56 is suitably guided to the tooth surface of the drive gear 36.

According to the front wheel drive apparatus 16 of the present embodiment, the second guide portion 62h is provided with the tapered portion 62m that is formed at the end portion 62c of the connection/disconnection sleeve 62 on the side opposite to the side of the drive gear 36 in the direction of the first rotation axis C1, and the oil OIL discharged from the lubricating pipe 56 is led by the tapered portion 62m to the bearing portion 36b of the drive gear 36. Hence, when the drive gear 36 and the input shaft 32 are disconnected by the connection/disconnection sleeve 62, the oil OIL discharged from the discharge port 56a of the lubricating pipe 56 is suitably guided to the bearing portion 36b of the drive gear 36.

According to the front wheel drive apparatus 16 of the present embodiment, the closure portion 62i is provided with the annular portion 62n that is formed at the end portion 62a of the connection/disconnection sleeve 62 on the side of the drive gear 36 in the direction of the first rotation axis C1, and when the connection/disconnection sleeve 62 is arranged in the third position, the discharge port 56a of the lubricating pipe 56 is blocked by a part of the outer circumferential surface 62o of the annular portion 62n. Hence, when the drive gear 36 and the storage casing 20 which is the non-rotating member are connected by the connection/disconnection sleeve 62, the discharge port 56a of the lubricating pipe 56 is suitably closed.

Although the embodiment of the present invention is described in detail above with reference to the drawings, the present invention is also applied to other aspects.

For example, although the pair of left and right front wheels 14L and 14R are driven by the drive power of the electric motor 12 in the front wheel drive apparatus 16 of the embodiment described above, the front wheel drive apparatus 16 may be used as, for example, a rear wheel drive apparatus for driving a pair of left and right rear wheels. Although in the embodiment described above, the front wheel drive apparatus 16 is applied to the electric vehicle 10 which runs only by the drive power of the electric motor 12, the front wheel drive apparatus 16 may be applied to, for example, a four-wheel drive hybrid vehicle in which a pair of left and right rear wheels are driven by drive power of an engine and in which the pair of left and right front wheels 14L and 14R are driven by the drive force of the electric motor 12.

Although in the embodiment described, above, the lubricating oil paths 62k and the like are provided in the first guide portion 62g of the connection/disconnection sleeve 62, for example, as long as the first guide portion 62g of the connection/disconnection sleeve 62 can guide the oil OIL discharged from the lubricating pipe 56 to the tooth surface of the drive gear 36 when the connection/disconnection sleeve 62 is arranged in the first position, the first guide portion 62g may have any shape. Although in the embodiment described above, the tapered portion 62m is provided in the second guide portion 62h of the connection/disconnection sleeve 62, for example, as long as the second guide portion 62h of the connection/disconnection sleeve 62 can guide the oil OIL discharged, from the lubricating pipe 56 to the bearing portion 36b of the drive gear 36 when the connection/disconnection sleeve 62 is arranged in the second position, the second guide portion 62h may have any shape. Although in the embodiment described above, the annular portion 62n is provided in the closure portion 62i of the connection/disconnection sleeve 62, for example, as long as the closure portion 62i of the connection/disconnection sleeve 62 can close the discharge port 56a of the lubricating pipe 56 when the connection/disconnection sleeve 62 is arranged in the third position, the closure portion 62i may have any shape.

Although the first hub member 66, the second hub member 68 and the third hub member 70 are respectively provided in the front wheel drive apparatus 16 of the embodiment as described above, for example, the front wheel drive apparatus 16 may have a configuration in which the third hub member 70 is not provided in the front wheel drive apparatus 16 and in which the connection/disconnection device 60 provided in the front wheel drive apparatus 16 does not have the function of connecting the drive gear 36 and the storage casing 20 that is the non-rotating member. In other words, the connection/disconnection device 60 may only selectively disconnect or connect the drive gear 36 and the input shaft 32 by the connection/disconnection sleeve 62.

Although the first hub member 66, the second hub member 68 and the third hub member 70 are respectively provided in the front wheel drive apparatus 16 of the embodiment as described above, for example, the front wheel drive apparatus 16 may have a configuration in which either the first hub member 66 or the second hub member 68 is not provided in the front wheel drive apparatus 16 and in which the connection/disconnection device 60 included in the front wheel drive apparatus 16 does not have the function of selectively disconnecting or connecting the drive gear 36 and the input shaft 32. In other words, the connection/disconnection device 60 may only selectively disconnect or connect the drive gear 36 and the storage casing 20 which is the non-rotating member by the connection/disconnection sleeve 62.

The embodiment described above is merely an embodiment, and the present invention can be practiced with aspects in which various variations and modifications are added based on the knowledge of a person skilled in the art.

REFERENCE SIGNS LIST

12: electric motor (rotating electrical machine)
14L, 14R: front wheels (wheels)
16: front wheel drive apparatus (vehicle drive apparatus)
20: storage casing (non-rotating member)
32: input shaft
34: counter shaft
34b: large diameter gear (gear)
36: drive gear
36b: bearing portion
54: catch tank (tank)
56: lubricating pipe
56a: discharge port
62: connection/disconnection sleeve
62a: end portion of the connection/disconnection sleeve on the drive gear
62c: end portion of the connection/disconnection sleeve on the side opposite to the side of the drive gear
62g: first guide portion (discharge portion)
62h: second guide portion (discharge portion)
62i: closure portion
62k: lubricating oil path
62m: tapered portion
62n: annular portion
62o: outer circumferential surface
64: actuator
66: first hub member
66a: first outer circumferential engagement teeth
68: second hub member
68a: second outer circumferential engagement teeth
70: third hub member
70a: third outer circumferential engagement teeth C1: first rotation axis C2: second rotation axis Oil: OIL (lubricating oil)

What is claimed is:

1. A vehicle drive apparatus
including a rotating electrical machine which serves as a drive power source for a plurality of wheels; an input: shaft which is coupled to the rotating electrical machine in a power transmittable manner and rotatably about a first rotation axis; a counter shaft which is provided rotatably about a second rotation axis parallel to the first rotation axis; a drive gear which engages with a gear provided on the counter shaft and which is provided in the input shaft relatively rotatably to the input shaft; and a connection/disconnection sleeve which is driven in a direction of the first rotation axis so as to selectively disconnect or connect the drive gear and the input shaft and the vehicle drive apparatus transmitting drive power from the rotating electrical machine through the input shaft and the counter shaft to the wheels so as to drive the wheels, wherein a lubricating pipe is provided above the connection/disconnection sleeve and has a discharge port through which a lubricating oil is discharged, the drive gear is relatively rotatably supported by the input shaft via a bearing portion provided on the drive gear, and the connection/disconnection sleeve includes a first guide portion guiding the lubricating oil discharged from the discharge port of the lubricating pipe to a tooth surface of the drive gear when the connection/disconnection sleeve is in a first position so as to connect the drive gear and the input shaft; and a second guide portion guiding the lubricating oil discharged from the discharge port of the lubricating pipe to the bearing portion when the connection/disconnection sleeve is in a second position so as to disconnect the drive gear and the input shaft.

2. The vehicle drive apparatus according to claim 1,
wherein the lubricating pipe discharges a lubricating oil stored in a tank for storing the lubricating oil from the discharge port, the connection/disconnection sleeve is driven in the direction of the first rotation axis so as to selectively disconnect or connect the drive gear and a non-rotating member provided in the vehicle drive apparatus and the connection/disconnection sleeve includes a closure portion which closes the discharge port of the lubricating pipe when the connection/disconnection sleeve is in a third position so as to connect the drive gear and the non-rotating member.

3. The vehicle drive apparatus according to claim 2,
wherein a first hub member including a first outer circumferential engagement tooth is integrally provided with the drive gear, a second hub member including a second outer circumferential engagement tooth is integrally provided with the input shaft, a third hub member including a third outer circumferential engagement, tooth is integrally provided with the non-rotating member, the connection/disconnection sleeve engages with at least one of the first outer circumferential engagement tooth, the second outer circumferential engagement tooth and the third outer circumferential engagement tooth, the connection/disconnection sleeve, the first hub member, the second hub member and the third hub member are arranged on the first rotation axis and the first outer circumferential engagement tooth, the second outer circumferential engagement tooth and the third outer circumferential engagement tooth have a same outside diameter.

4. The vehicle drive apparatus according to claim 3,
wherein the first position is a position in which the connection/disconnection sleeve engages both with the first outer circumferential engagement tooth of the first hub member and with the second outer circumferential engagement tooth of the second hub member, and the third position is a position in which the connection/disconnection sleeve engages both with the first outer circumferential engagement tooth of the first hub member and with the third outer circumferential engagement tooth of the third hub member.

5. The vehicle drive apparatus according to claim 2, comprising an actuator which moves the connection/disconnection sleeve in the direction of the first rotation axis selectively to one of the first position, the second position and the third position.

6. The vehicle drive apparatus according to claim 1, wherein a lubricating oil path formed in the connector/disconnection sleeve is provided with the first guide portion, and the lubricating oil discharged from the lubricating pipe is passed through the lubricating oil path and is guided to the tooth surface of the drive gear.

7. The vehicle drive apparatus according to claim 1, wherein a tapered portion formed at an end portion of the connection/disconnection sleeve in the direction of the first rotation axis is provided with the second guide portion, and the lubricating oil discharged from the lubricating pipe is guided by the tapered portion to the bearing portion of the drive gear.

8. The vehicle drive apparatus according to claim 2, wherein an annular portion formed at the end portion of connection/disconnection sleeve in the direction of the first rotation axis is provided with the closure portion, and when the connection/disconnection sleeve is arranged at the third position, the discharge port of the lubricating pipe is blocked by a part of an outer circumferential surface of the annular portion.

9. A vehicle drive apparatus including a rotating electrical machine which serves as a drive power source for a plurality of wheels; an input shaft which is coupled to the rotating electrical machine in a power transmittable manner and rotatably about a first rotation axis; a counter shaft which is provided rotatably about a second rotation axis parallel to the first rotation axis; a drive gear which engages with a gear provided on the counter shaft and which is provided relatively rotatably to the input shaft; and a connection/disconnection sleeve which is driven in a direction of the first rotation axis so as to selectively disconnect or connect the drive gear and a non-rotating member and the vehicle drive apparatus transmitting drive power from the rotating electrical machine through the input shaft and the counter shaft to the wheels so as to drive the wheels, wherein a lubricating pipe is provided above the connection/disconnection sleeve and has a discharge port through which a lubricating oil stored in a tank for storing the lubricating oil is discharged, and the connection/disconnection sleeve includes a discharge portion discharging the lubricating oil from the discharge port of the lubricating pipe when the connection/disconnection sleeve is in a position so as to disconnect the drive gear and the non-rotating member; and a closure portion closing the discharge port of the lubricating pipe when the connection/disconnection sleeve is in a position so as to connect the drive gear and the non-rotating member.

\* \* \* \* \*